United States Patent
Sale

(10) Patent No.: US 7,432,500 B2
(45) Date of Patent: Oct. 7, 2008

(54) AZIMUTHAL BINNING OF DENSITY AND POROSITY DATA

(75) Inventor: Matthew J. Sale, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 136 days.

(21) Appl. No.: 11/063,153

(22) Filed: Feb. 22, 2005

(65) Prior Publication Data

US 2005/0189483 A1 Sep. 1, 2005

Related U.S. Application Data

(60) Provisional application No. 60/547,838, filed on Feb. 26, 2004.

(51) Int. Cl.
*G01V 5/12* (2006.01)
(52) U.S. Cl. ............... 250/269.3; 250/256; 250/266
(58) Field of Classification Search ............. 250/269.3, 250/254, 256, 262, 265, 266, 267
See application file for complete search history.

(56) References Cited

U.S. PATENT DOCUMENTS

| 3,202,822 A | 8/1965 | Kehler | 250/83.3 |
|---|---|---|---|
| 3,321,625 A | 5/1967 | Wahl | 250/71.5 |
| 3,846,631 A | 11/1974 | Kehler | 250/269 |
| 3,858,037 A | 12/1974 | Moore et al. | 235/193 |
| 3,864,569 A | 2/1975 | Tittman | 250/264 |
| 4,628,202 A | 12/1986 | Minette | 250/269 |
| 5,091,644 A * | 2/1992 | Minette | 250/254 |
| 5,250,806 A | 10/1993 | Rhein-Knudsen et al. | 250/254 |
| 5,397,893 A | 3/1995 | Minette | 250/254 |
| 5,513,528 A | 5/1996 | Holenka et al. | 73/151 |
| 6,215,120 B1 * | 4/2001 | Gadeken et al. | 250/256 |
| 6,307,199 B1 * | 10/2001 | Edwards et al. | 250/269.3 |
| 6,584,837 B2 | 7/2003 | Kurkoski | 73/152.02 |
| 6,696,684 B2 * | 2/2004 | Radtke et al. | 250/269.3 |
| 6,944,548 B2 | 9/2005 | Radtke et al. | 702/8 |
| 7,000,700 B2 * | 2/2006 | Cairns et al. | 166/255.2 |
| 7,103,982 B2 * | 9/2006 | Haugland | 33/304 |
| 7,114,565 B2 * | 10/2006 | Estes et al. | 166/255.2 |

* cited by examiner

*Primary Examiner*—David P. Porta
*Assistant Examiner*—Mark R Gaworeki
(74) *Attorney, Agent, or Firm*—Madan, Mossman & Sriram, P.C.

(57) ABSTRACT

A logging-while-drilling density sensor includes a gamma ray source and at least two NaI detectors spaced apart from the source for determining measurements indicative of the formation density. A magnetometer on the drill collar measures the relative azimuth of the NaI detectors. Measurements made by the detectors are partitioned into bins defined by azimuth. A compensated bulk density is determined for selected ones of said azimuthal sectors that meet a threshold test related to a minimum difference of measurements or a minimum correction. The method of the invention may also be used with neutron porosity logging devices.

18 Claims, 4 Drawing Sheets

AZIMUTHAL BINNING OF DENSITY AND POROSITY DATA

CROSS-REFERENCES TO RELATED APPLICATIONS

This applications claims priority from U.S. Provisional Patent Application Ser. No. 60/547838 filed on Feb. 26, 2004.

BACKGROUND OF THE INVENTION

1. Field of the Invention

This invention relates generally to borehole logging apparatus and methods for performing nuclear radiation based measurements. More particularly, this invention relates to a new and improved apparatus for effecting formation density logging in real time using gamma rays in a measurement-while-drilling (MWD) tool.

2. Background of the Art

Oil well logging has been known for many years and provides an oil and gas well driller with information about the particular earth formation being drilled. In conventional oil well logging, after a well has been drilled, a probe known as a sonde is lowered into the borehole and used to determine some characteristic of the formations which the well has traversed. The probe is typically a hermetically sealed steel cylinder which hangs at the end of a long cable which gives mechanical support to the sonde and provides power to the instrumentation inside the sonde. The cable also provides communication channels for sending information up to the surface. It thus becomes possible to measure some parameter of the earth's formations as a function of depth, that is, while the sonde is being pulled uphole. Such "wireline" measurements are normally done in real time (however, these measurements are taken long after the actual drilling has taken place).

A wireline sonde usually transmits energy into the formation as well as a suitable receiver for detecting the same energy returning from the formation. These could include resistivity, acoustic, or nuclear measurements. The present invention is discussed with reference to a density measurement tool that emits nuclear energy, and more particularly gamma rays, but the method of the present invention is applicable to other types of logging instruments as well. Wireline gamma ray density probes are well known and comprise devices incorporating a gamma ray source and a gamma ray detector, shielded from each other to prevent counting of radiation emitted directly from the source. During operation of the probe, gamma rays (or photons) emitted from the source enter the formation to be studied, and interact with the atomic electrons of the material of the formation by photoelectric absorption, by Compton scattering, or by pair production. In photoelectric absorption and pair production phenomena, the particular photons involved in the interacting are removed from the gamma ray beam.

In the Compton scattering process, the involved photon loses some of its energy while changing its original direction of travel, the loss being a function of the scattering angle. Some of the photons emitted from the source into the sample are accordingly scattered toward the detector. Many of these never reach the detector, since their direction is changed by a second Compton scattering, or they are absorbed by the photoelectric absorption process of the pair production process. The scattered photons that reach the detector and interact with it are counted by the electronic equipment associated with the detector.

Examples of prior art wireline density devices are disclosed in U.S. Pat. Nos. 3,202,822; 3,321,625; 3,846,631; 3,858,037; 3,864,569 and 4,628,202. Wireline formation evaluation tools such as the aforementioned gamma ray density tools have many drawbacks and disadvantages including loss of drilling time, the expense and delay involved in tripping the drillstring so as to enable the wireline to be lowered into the borehole and both the build up of a substantial mud cake and invasion of the formation by the drilling fluids during the time period between drilling and taking measurements. An improvement over these prior art techniques is the art of measurement-while-drilling (MWD) in which many of the characteristics of the formation are determined substantially contemporaneously with the drilling of the borehole.

Measurement-while-drilling logging either partly or totally eliminates the necessity of interrupting the drilling operation to remove the drillstring from the hole in order to make the necessary measurements by wireline techniques. In addition to the ability to log the characteristics of the formation through which the drill bit is passing, this information on a real time basis provides substantial safety advantages for the drilling operation.

One potential problem with MWD logging tools is that the measurements are typically made while the tool is rotating. Since the measurements are made shortly after the drillbit has drilled the borehole, washouts are less of a problem than in wireline logging. Nevertheless, there can be some variations in the spacing between the logging tool and the borehole wall ("standoff") with azimuth. Nuclear measurements are particularly degraded by large standoffs due to the scattering produced by borehole fluids between the tool and the formation.

U.S. Pat. No. 5,397,893 to Minette, the contents of which are fully incorporated herein be reference, teaches a method for analyzing data from a measurement-while-drilling (MWD) formation evaluation logging tool which compensates for rotation of the logging tool (along with the rest of the drillstring) during measurement periods. The density measurement is combined with the measurement from a borehole caliper, such as an acoustic caliper. The acoustic caliper continuously measures the standoff as the tool is rotating around the borehole. If the caliper is aligned with the density source and detectors, this gives a determination of the standoff in front of the detectors at any given time. This information is used to separate the density data into a number of bins based on the amount of standoff. After a pre-set time interval, the density measurement can then be made. The first step in this process is for short space (SS) and long space (LS) densities to be calculated from the data in each bin. Then, these density measurements are combined in a manner that minimizes the total error in the density calculation. This correction is applied using the "spine and ribs" algorithm and graphs such as that shown in FIG. 2. In the figure, the abscissa 101 is the difference between the LS and SS densities while the ordinate 103 is the correction that is applied to the LS density to give a corrected density using the curve 105.

U.S. Pat. No. 5,513,528 to Holenka et al teaches a method and apparatus for measuring formation characteristics as a function of azimuth about the borehole. The measurement apparatus includes a logging while drilling tool which turns in the borehole while drilling. The down vector of the tool is derived first by determining an angle $\phi$ between a vector to the earth's north magnetic pole, as referenced to the cross sectional plane of a measuring while drilling (MWD) tool and a gravity down vector as referenced in said plane. The logging while drilling (LWD) tool includes magnetometers and accelerometers placed orthogonally in a cross-sectional plane. Using the magnetometers and/or accelerometer measurements, the toolface angle can usually be determined. The angle $\phi$ is transmitted to the logging while drilling tool thereby allowing a continuous determination of the gravity down position in the logging while drilling tool. Quadrants, that is, angular distance segments, are measured from the down vector. Referring to FIG. 3, an assumption is made that the down vector defines a situation in which the standoff is at a minimum, allowing for a good spine and rib correction. A drawback of the Holenka method is that the assumption of minimum standoff is not necessarily satisfied, so that the down position may in fact correspond to a significant standoff: without a standoff correction and the results may be erroneous.

In a centralized or stabilized tool, the standoff will generally be uniform with azimuth. Holenka (U.S. Pat. No. 5,513,528) and Edwards (U.S. Pat. No. 6,307,199) also show how azimuthal measurements of density may be diagnostic of bed boundaries intersected by an inclined borehole. In the absence of standoff corrections, this can only be a qualitative measurement and the absolute density measurements may be suspect.

U.S. Pat. No. 6,584,837 to Kurkoski and having the same assignee as the present application addressed the problem of varying standoff by using caliper measurements to measure the standoff. Using the caliper measurements and orientation measurements, spatial bins covering both azimuth and offset are defined. Within each azimuthal sector, a weighted average of the density values gives an azimuthal density measurement that is superior to earlier methods. The method of Kurkoski requires the use of a caliper. In addition, measurements may need to be averaged over many tool rotations to provide meaningful statistics for measurements within each spatial bin. This may result in decreased vertical resolution. There is a need for a method of determining azimuthal density in earth formations without the use of caliper measurements that does not require accumulation of measurements over too many rotations of the tool. The present invention satisfies this need.

SUMMARY OF THE INVENTION

The present invention is a method of logging of an earth formation. The earth formation is irradiated using a radiation source on a logging tool in a borehole in the earth formation. Measurements are made with a pair of spaced-apart radiation detectors during continued rotation of the tool and partitioned over a selected time interval into a plurality of azimuthal sectors. One the plurality of azimuthal sectors for which a function of the partitioned measurements attains a minimum value is identified and a property of the earth formation using the measurements within the identified one of the plurality of azimuthal sectors. The radiation source may be a gamma ray source or a neutron source. The detector may be a gamma ray detector or a neutron detector. The function may be a difference of measurements made by the two detectors. The partitioning may be done based on measurements made by an orientation sensor on the logging tool. The minimum value may be compared to a threshold prior to the determination of the formation property. Measurements from additional sectors may be used if they are less than the threshold. The determined property may be the density of porosity of the formation.

Another embodiment of the invention is an apparatus for use in a wellbore in an earth formation. The apparatus includes a tool including a radiation source which irradiates the earth formation. The tool also has a pair of spaced-apart radiation detectors that measure radiation during continued rotation of the tool. A processor partitions the measurements made by two spaced-apart detectors over a selected time interval into a plurality of azimuthal sectors and identifies one of the plurality of azimuthal sectors for which a function of the partitioned measurements attains a minimum value. The processor then determines a property of the earth formation using the measurements within the identified one of the plurality of azimuthal sectors. The source may be a gamma ray source or a neutron source. The detectors may be gamma ray detectors or neutron detectors. The function may be a difference of the measurements made by the two detectors. An orientation sensor makes measurements of the orientation of the tool which are then used by the processor in the partitioning. The orientation sensor may be a magnetometer. The processor may compare the minimum value to a threshold prior to determination of the formation property. The processor may further identify additional sectors where the measurements lie below the threshold and use the additional measurements for the determination of the formation property. The property may be a density of or a porosity. The tool may be conveyed into the borehole on a drilling tubular.

Another embodiment of the invention is a computer readable medium for use with an apparatus conveyed in a wellbore in an earth formation. The apparatus includes a tool that has a radiation source which irradiates the earth formation and a pair of spaced-apart radiation detectors that measure radiation during continued rotation of the tool. The tool also includes an orientation sensor. The medium includes instructions that enable partitioning of the measurements made by two spaced-apart detectors over a selected time interval into a plurality of azimuthal sectors, identification one of the plurality of azimuthal sectors for which a function of the partitioned measurements attains a minimum value, and determination of a property of the earth formation using the measurements within the one of the plurality of azimuthal sectors. The medium is selected from (i) a ROM, (ii) an EPROM, (iii) an EAROM, (iv) a Flash Memory, and, (v) and Optical disk.

BRIEF DESCRIPTION OF THE FIGURES

For detailed understanding of the present invention, references should be made to the following detailed description of the invention, taken in conjunction with the accompanying drawings, in which like elements have been given like numerals and wherein.

DETAILED DESCRIPTION OF THE INVENTION

Figure 1:
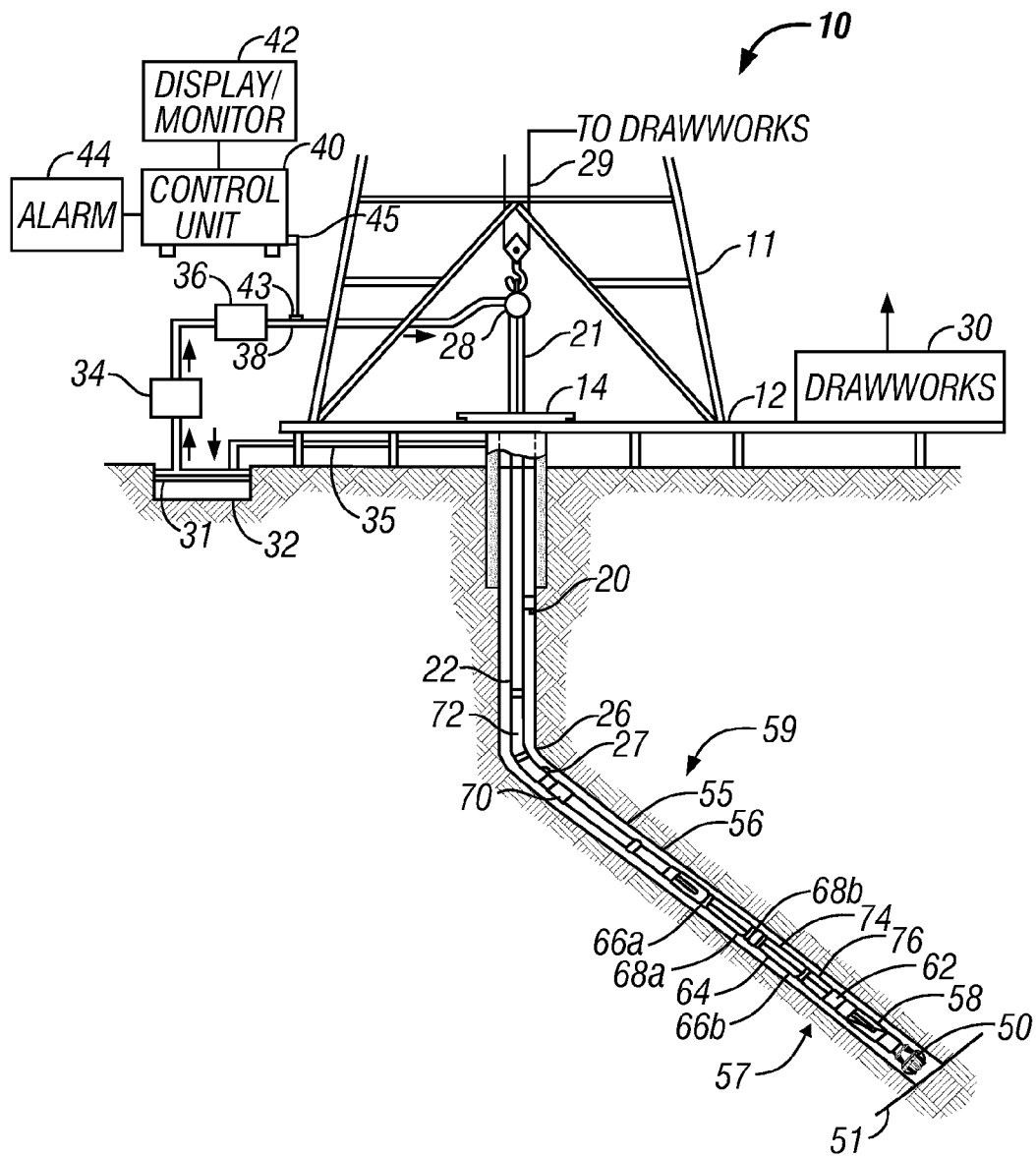
FIG. 1 (Prior Art) illustrates a measurement-while-drilling (MWD) logging device that is suitable for use with the present invention.

FIG. 1 shows a schematic diagram of a drilling system 10 having a downhole assembly containing an acoustic sensor system and the surface devices according to one embodiment of present invention. As shown, the system 10 includes a conventional derrick 11 erected on a derrick floor 12 which supports a rotary table 14 that is rotated by a prime mover (not shown) at a desired rotational speed. A drill string 20 that includes a drill pipe section 22 extends downward from the rotary table 14 into a borehole 26. A drill bit 50 attached to the drill string downhole end disintegrates the geological formations when it is rotated. The drill string 20 is coupled to a drawworks 30 via a kelly joint 21, swivel 28 and line 29 through a system of pulleys 27. During the drilling operations, the drawworks 30 is operated to control the weight on bit and the rate of penetration of the drill string 20 into the borehole 26. The operation of the drawworks is well known in the art and is thus not described in detail herein.

During drilling operations a suitable drilling fluid (commonly referred to in the art as "mud") 31 from a mud pit 32 is circulated under pressure through the drill string 20 by a mud pump 34. The drilling fluid 31 passes from the mud pump 34 into the drill string 20 via a desurger 36, fluid line 38 and the kelly joint 21. The drilling fluid is discharged at the borehole bottom 51 through an opening in the drill bit 50. The drilling fluid circulates uphole through the annular space 27 between the drill string 20 and the borehole 26 and is discharged into the mud pit 32 via a return line 35. A variety of sensors (not shown) may be deployed on the surface according to known methods in the art to provide information about various drilling-related parameters, such as fluid flow rate, weight on bit, hook load, etc.

A surface control unit 40 receives signals from the downhole sensors and devices via a sensor 43 placed in the fluid line 38 and processes such signals according to programmed instructions provided to the surface control unit. The surface control unit displays desired drilling parameters and other information on a display/monitor 42 which information is utilized by an operator to control the drilling operations. The surface control unit 40 contains a computer, memory for storing data, data recorder and other peripherals. The surface control unit 40 also includes models and processes data according to programmed instructions and responds to user commands entered through a suitable means, such as a keyboard. The control unit 40 is may be adapted to activate alarms 44 when certain unsafe or undesirable operating conditions occur.

A drill motor or mud motor 55 coupled to the drill bit 50 via a drive shaft (not shown) disposed in a bearing assembly 57 rotates the drill bit 50 when the drilling fluid 31 is passed through the mud motor 55 under pressure. The bearing assembly 57 supports the radial and axial forces of the drill bit, the downthrust of the drill motor and the reactive upward loading from the applied weight on bit. A stabilizer 58 coupled to the bearing assembly 57 acts as a centralizer for the lowermost portion of the mud motor assembly.

In one embodiment of the system of present invention, the downhole subassembly 59 (also referred to as the bottomhole assembly or "BHA") which contains the various sensors and MWD devices to provide information about the formation and downhole drilling parameters and the mud motor, is coupled between the drill bit 50 and the drill pipe 22. The downhole assembly 59 preferably is modular in construction, in that the various devices are interconnected sections so that the individual sections may be replaced when desired.

Still referring back to FIG. 1, the BHA may contains sensors and devices in addition to the above-described sensors. Such devices include a device for measuring the formation resistivity near the drill bit, a gamma ray device for measuring the formation gamma ray intensity and devices for determining the inclination and azimuth of the drill string. The formation resistivity measuring device 64 is may be coupled above the lower kick-off subassembly 62 that provides signals, from which resistivity of the formation near or in front of the drill bit 50 is determined. A dual propagation resistivity device ("DPR") having one or more pairs of transmitting antennae 66a and 66b spaced from one or more pairs of receiving antennae 68a and 68b is used. Magnetic dipoles are employed which operate in the medium frequency and lower high frequency spectrum. In operation, the transmitted electromagnetic waves are perturbed as they propagate through the formation surrounding the resistivity device 64. The receiving antennae 68a and 68b detect the perturbed waves. Formation resistivity is derived from the phase and/or amplitude of the detected signals. The detected signals are processed by a downhole circuit that may be placed in a housing 70 above the mud motor 55 and transmitted to the surface control unit 40 using a suitable telemetry system 72. Determination of formation resistivity from amplitude and phase measurements is well known in prior art. U.S. Pat. No. 5,811,973 to Meyer having the same assignee as the present invention and the contents of which are fully incorporated herein by reference, further teaches the determination of resistivity of the connate formation fluid, the dielectric constant of the dry rock matrix, and the water filled porosity of the formation. Such determinations may also be made with the present invention using the methods taught by Meyer.

The inclinometer 74 and gamma ray device 76 are suitably placed along the resistivity measuring device 64 for respectively determining the inclination of the portion of the drill string near the drill bit 50 and the formation gamma ray intensity. Any suitable inclinometer and gamma ray device, however, may be utilized for the purposes of this invention. In addition, an azimuth device (not shown), such as a magnetometer or a gyroscopic device, may be utilized to determine the drill string azimuth. Such devices are known in the art and are, thus, not described in detail herein. In the above-described configuration, the mud motor 55 transfers power to the drill bit 50 via one or more hollow shafts that run through the resistivity measuring device 64. The hollow shaft enables the drilling fluid to pass from the mud motor 55 to the drill bit 50. In an alternate embodiment of the drill string 20, the mud motor 55 may be coupled below resistivity measuring device 64 or at any other suitable place.

The drill string contains a modular sensor assembly, a motor assembly and kick-off subs. In one embodiment, the sensor assembly includes a resistivity device, gamma ray device, and inclinometer. A processor (not shown) is located downhole for processing the data. Due to the large amount of data that are obtained and processed downhole, a memory device having adequate capacity is necessary.

The above-noted devices transmit data to the downhole telemetry system 72, which in turn transmits the received data uphole to the surface control unit 40. The downhole telemetry also receives signals and data from the uphole control unit 40 and transmits such received signals and data to the appropriate downhole devices. The present invention may utilize a mud pulse telemetry technique to communicate data from downhole sensors and devices during drilling operations. A transducer 43 placed in the mud supply line 38 detects the mud pulses responsive to the data transmitted by the downhole telemetry 72. Transducer 43 generates electrical signals in response to the mud pressure variations and transmits such signals via a conductor 45 to the surface control unit 40. Other telemetry techniques such electromagnetic and acoustic techniques or any other suitable technique may be utilized for the purposes of this invention. The drilling assembly also includes a directional sensor. Without limiting the scope of the invention, the directional sensor can be a magnetometer or of the inertial type.

In one embodiment of the invention, a drilling sensor module 59 is placed near the drill bit 50. The drilling sensor module contains sensors, circuitry and processing software and algorithms relating to the dynamic drilling parameters. Such parameters may include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the telemetry system 72.

Figure 3:
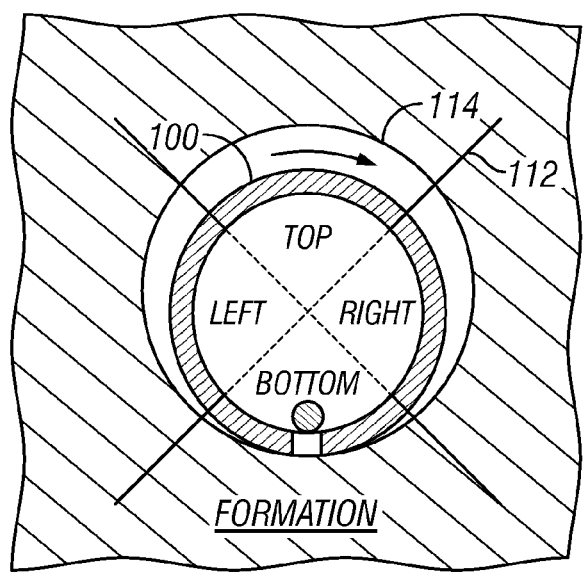
FIG. 3 (Prior art) shows an idealized situation in which a rotating tool in a wellbore has a minimum standoff when the tool is at the bottom of the wellbore.
Figure 4:
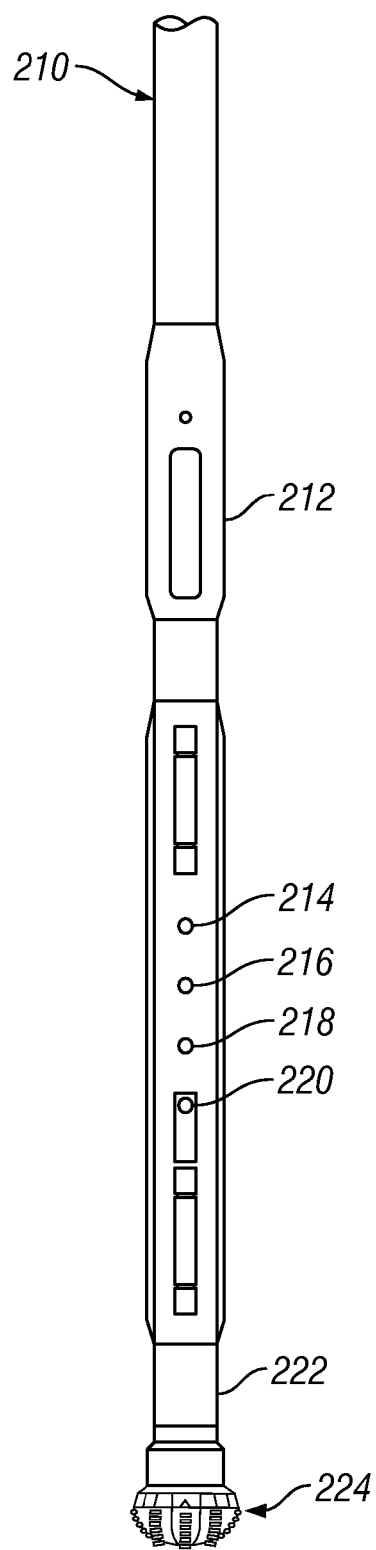
FIG. 4 (Prior art) illustrates the arrangement of the nuclear sensors on a logging-while-drilling device.

Referring now to FIG. 3 a diagram of the basic components for an exemplary gamma-ray density tool. This tool comprises an upper section of a bottom hole assembly (BHA) including a drill collar 210. The drilling tubular used for conveying the BHA is well known in the art and is not disclosed here. The logging tool of the present invention includes a gamma-ray source 214 and two spaced gamma-ray detector assemblies 216 and 218. All three components are placed along a single axis that has been located parallel to the axis of the tool. The detector 216 closest to the gamma-ray source will be referred to as the "short space detector" and the one farthest away 218 is referred to as the "long space detector". Gamma-ray shielding (not shown) is located between detector assemblies 216, 218 and source 214. Windows (ports) open up to the formation from both the detector assemblies and the source. The optional acoustic caliper (A1) 120 is inline and close to the gamma detectors (LS & SS). A layer of drilling fluid (mud) is present between the formation and the detector assemblies and source. Also shown in FIG. 4 are the lower section of the bottomhole assembly 222 and drill bit 224 and one or more additional sensor assemblies 212.

Figure 5:
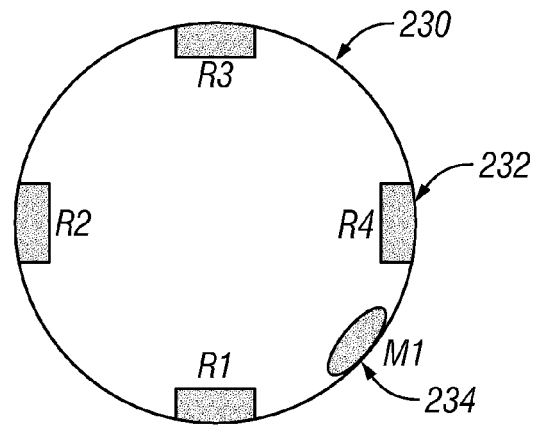
FIG. 5 (Prior art) shows an exemplary configuration of calipers and magnetometer on a downhole logging tool.

FIG. 5 illustrates cross section of an acoustic caliper device. Four sensors R1, R2, R3 and R4 are shown circumferentially disposed around the drill collar with an azimuthal separation of 90°. Each sensor uses acoustic measurements to determine a travel time to the closest point on the borehole. For such a caliper, a commonly output measurement in well logging is the quantity $$S_1 = \frac{2 \cdot (x_1 + x_2 + x_3 + x_4)}{4} + T \quad (1)$$

$$S_{x\text{-}axis} = \frac{2 \cdot (x_1 + x_3)}{2} + T$$

$$S_{y\text{-}axis} = \frac{2 \cdot (x_2 + x_3)}{2} + T$$

(1)

where the $x_i$'s are standoff measurements made by the calipers R1, R2, R3 and R4 respectively, T is drill collar (tool) diameter, $S_1$ is a simple caliper, $S_{x\text{-}axis}$ a simple caliper in the x axis, $S_{y\text{-}axis}$ is a simple caliper in the y axis. The acoustic sensor R1 is in the same azimuthal position as are the gamma ray detector assemblies shown in FIG. 4. The apparatus shown in FIG. 5 illustrates what is used in Kurkoski. In the present invention, caliper measurements are not necessary, but an orientation sensor such as a magnetometer is necessary in order to determine toolface orientation of the BHA.

In one embodiment of the present invention, the sensor arrangement includes a magnetometer 234 as shown in FIG. 5. Magnetometer M1 makes measurements of the direction of the earth's magnetic field. Except for the rare case wherein the borehole is being drilled along the direction of the earth's magnetic field, the magnetometer output in conjunction with borehole survey information can be used to determine the relative orientation of the sensor R1 to the vertical.

Figure 6:
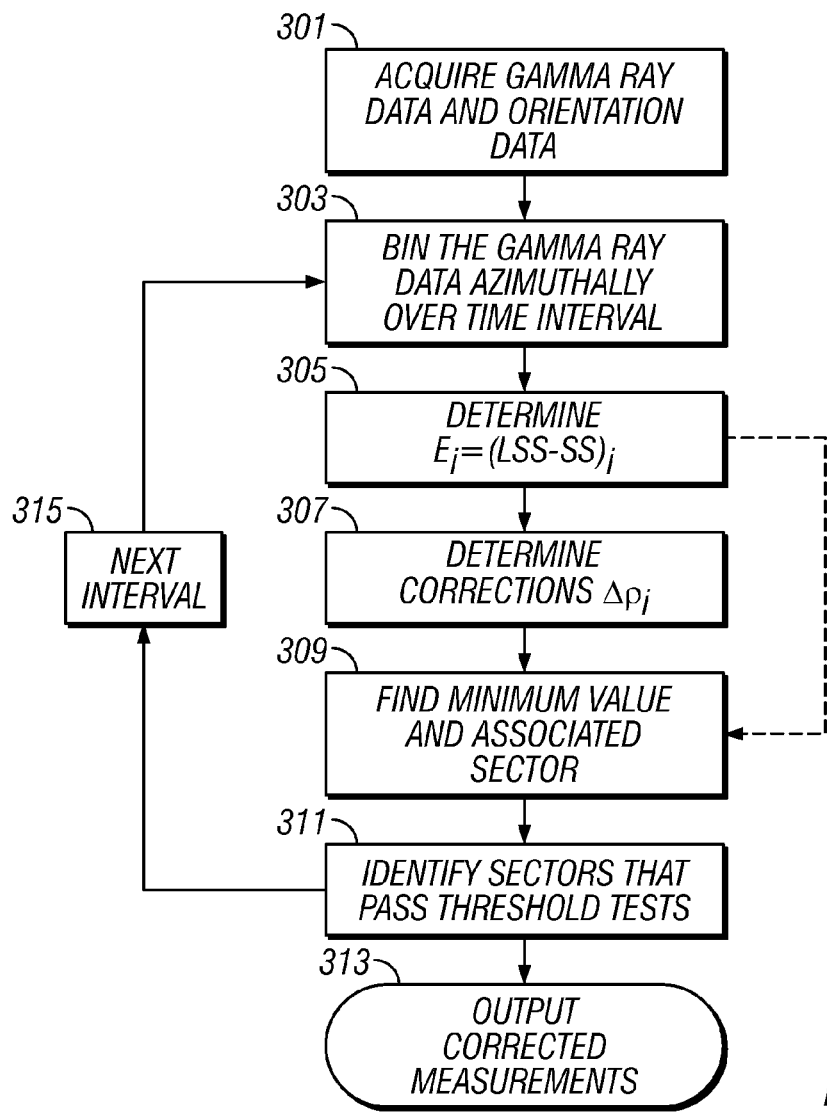
FIG. 6 illustrates some of the steps used in the method of the present invention.

Referring now to FIG. 6, a flow chart of steps involved in carrying out the method of the present invention is depicted. The flow chart is specific to the use of gamma ray measurements used for density measurements, but this is not a limitation of the method. The method could be used with, for example, measurements made with neutron porosity sensors. The gamma ray counts are made with the long spaced and short spaced sensor, along with the corresponding orientation sensor measurements 301 during continued rotation of the BHA. The LS and SS measurements are then binned azimuthally by toolface angle 303 over a specified time interval. In one embodiment of the invention, the time interval is chosen to be ten seconds, though other values could also be used. The differences between the LS and SS sensor measurements $E_i=(LS-SS)_i$, i=1, 2, ... n, for each of the i bins is determined 305. In one embodiment of the invention, 4 bins are defined. In a second embodiment of the invention, 8 bins are used. Other values for n could also be used. The choice of the time interval and the number of bins is based on the need to have sufficient statistics within each bin while, at the same time, having an adequate vertical resolution with continued penetration of the earth formation by the drillbit.

In one embodiment of the invention, the spine and rib method is applied to determine the density corrections $\Delta\rho_i$ 307 for each of the bins. Next, the values of the corrections over the plurality of the bins are scanned and the minimum value is determined 309. This may be denoted by $\Delta\rho_{min}$. This minimum density correction would correspond to the bin where the standoff of the sensor from the borehole wall is minimum. In a highly deviated borehole, or in a near horizontal borehole, the sector having the minimum value is commonly the bottom sector, though this need not necessarily be the case as there is a tendency on the part of the drillbit to "climb" up the borehole wall during continued rotation.

Once the minimum value has been identified, a check is made to see if this minimum correction lies below a screening threshold. This may be denoted by the test:

$$\Delta\rho_{min} \leq T_1 \quad (2).$$

If the test is not satisfied, data for the selected time interval have an excessive standoff and are not used. If the test is satisfied, other sectors in which the corrections $\Delta\rho_i$ are within a certain threshold of the minimum correction are identified. This may be denoted by identifying:

$$i: \Delta\rho_i \leq T_2 \cdot \Delta\rho_{min} \quad (3).$$

The two threshold tests are depicted in FIG. 6 by 311. The data from the sector that has the minimum value and the sectors that satisfy eq. (3) are then used to determine a density value for the selected time interval. This is done by forming a weighted sum of the selected density values are output 313. Data from a subsequent time interval 315 are then processed starting again at 303.

Figure 2:
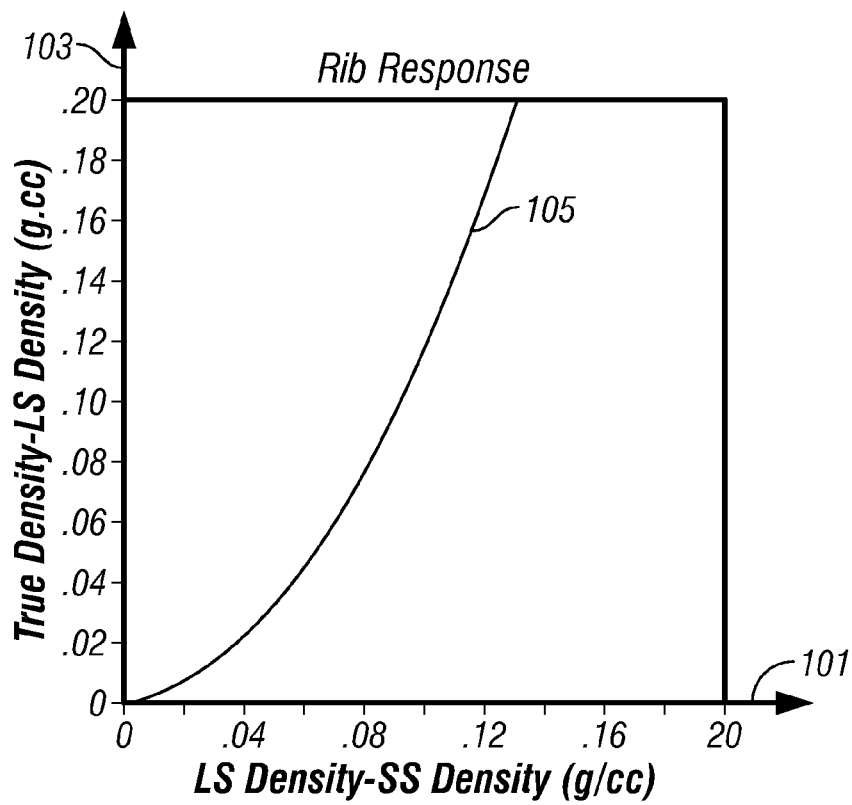
FIG. 2 (Prior Art) shows an example of how density measurements made from a long spaced and a short spaced tool are combined to give a corrected density.

In another embodiment of the invention, the determination of the minimum is done on the differences $E_i$ instead of on the corrections $\Delta\rho_i$. Because the spine and rib correction given by FIG. 2 is a monotonic function of error $E_i$, the same sector will be identified as having the minimum value. However, the sectors that pass the threshold test 311 may be somewhat different. In either case, the corrected density values are output at 313 using the weighting.

The weighting that is used in one embodiment of the invention is an exponential weighting of corrected density values from all the sectors that pass the threshold tests. The end result of using the method of the present invention is a density value that is corrected for standoff without using standoff measurements. This is different from Kurkoski where the end result is a density image. Due to the fact that standoff binning is not used, the statistics of the measurements may be better than in the method of Kurkoski.

The processing of the data may be accomplished by a downhole processor. Implicit in the control and processing of the data is the use of a computer program implemented on a suitable machine readable medium that enables the processor to perform the control and processing. The machine readable medium may include ROMs, EPROMs, EAROMs, Flash Memories and Optical disks.

While the foregoing disclosure is directed to the specfic embodiments of the invention, various modifications will be apparent to those skilled in the art. It is intended that all variations within the scope and spirit of the appended claims be embraced by the foregoing disclosure.

What is claimed is:

1. A method of logging of an earth formation comprising:
   (a) irradiating an earth formation using a radiation source on a logging tool in a borehole in the earth formation;
   (b) making measurements with a pair of spaced-apart radiation detectors during continued rotation of the tool;
   (c) partitioning the measurements made by two spaced-apart detectors over a selected time interval into a plurality of azimuthal sectors;
   (d) identifying one of the plurality of azimuthal sectors for which a function of the partitioned measurements attains a minimum value;
   (e) determining a property of the earth formation using the measurements within the one of the plurality of azimuthal sectors, the determination being based at least in part on comparing the function of the partitioned measurements within the one sector to a threshold; and
   (f) recording the determined property on a suitable medium.

2. The method of claim 1 wherein the radiation source comprises a gamma ray source and the pair of spaced apart detectors comprises gamma ray detectors.

3. The method of claim 2 wherein the function is a difference of measurements by the two detectors.

4. The method of claim 1 wherein the partitioning is based at least in part on measurements made by an orientation sensor on the logging tool.

5. The method of claim 1 further comprising:
   (i) identifying at least one additional one of the plurality of sectors for which the function is less than the threshold value, and
   (ii) using the measurements within the at least one additional one of the plurality of azimuthal sectors for determining the property of the earth formation.

6. The method of claim 1 wherein the property is a density of the earth formation.

7. The method of claim 1 wherein the detectors comprise neutron detectors and the property is a porosity of the earth formation.

8. An apparatus for use in a wellbore in an earth formation, the apparatus comprising:
   (a) a tool including a radiation source configured to irradiate the earth formation;
   (b) a pair of spaced-apart radiation detectors on the tool configured to measure radiation during continued rotation of the tool;
   (c) a processor which is configured to:
      (i) partition the measurements made by two spaced-apart detectors over a selected time interval into a plurality of azimuthal sectors;
      (ii) identify one of the plurality of azimuthal sectors for which a function of the partitioned measurements attains a minimum value; and
      (iii) determine a property of the earth formation using the measurements within the one of the plurality of azimuthal sectors, the determination being based at least in part on comparing the function of the partitioned measurements within the one sector to a threshold.

9. The apparatus of claim 8 wherein the radiation source comprises a gamma ray source and the pair of spaced apart detectors comprises gamma ray detectors.

10. The apparatus of claim 9 wherein the function is a difference of measurements by the two detectors.

11. The apparatus of claim 8 further comprising an orientation sensor on the tool, wherein the processor is configured to partition based at least in part on measurements made by the orientation sensor.

12. The apparatus of claim 11 wherein the orientation sensor comprises a magnetometer.

13. The apparatus of claim 8 wherein the processor is further configured to:
   (i) identify at least one additional one of the plurality of sectors for which the function is less than the threshold value, and
   (ii) use the measurements within the at least one additional one of the plurality of azimuthal sectors for determining the property of the earth formation.

14. The apparatus of claim 8 wherein the property is a density of the earth formation.

15. The apparatus of claim 8 wherein the detectors comprise neutron detectors and the property is a porosity of the earth formation.

16. The apparatus of claim 8 further comprising a drilling tubular configured to convey the tool into the borehole.

17. A computer readable medium for use with an apparatus conveyed in a wellbore in an earth formation, the apparatus comprising:
   (a) a tool including a radiation source which irradiates the earth formation;
   (b) a pair of spaced-apart radiation detectors on the tool that measures radiation during continued rotation of the tool; and
   (c) an orientation sensor;
the medium comprising instructions which enable a processor to:
   (d) partition the measurements made by two spaced-apart detectors over a selected time interval into a plurality of azimuthal sectors;
   (e) identify one of the plurality of azimuthal sectors for which a function of the partitioned measurements attains a minimum value;
   (f) determine a property of the earth formation using the measurements within the one of the plurality of azimuthal sectors, the determination being based at least in part on comparing the function of the partitioned measurements within the one sector to a threshold; and
   (g) record the determined property on a suitable medium.

18. The medium of claim 17 comprising at least one of (i) a ROM, (ii) an EPROM, (iii) an EAROM, (iv) a Flash Memory, and, (v) and Optical disk.

* * * * *

UNITED STATES PATENT AND TRADEMARK OFFICE
CERTIFICATE OF CORRECTION

PATENT NO. : 7,432,500 B2  
APPLICATION NO. : 11/063153  
DATED : October 7, 2008  
INVENTOR(S) : Matthew J. Sale Page 1 of 1

It is certified that error appears in the above-identified patent and that said Letters Patent is hereby corrected as shown below:

column 9, line 28, delete "two", insert --the pair of--;

column 9, line 38, delete "threshold", insert --threshold value--;

column 9, line 45, delete "two", insert --pair of--;

column 10, line 2, delete "two", insert --the pair of--;

column 10, line 13, delete "threshold", insert --threshold value--;

column 10, line 18, delete "two", insert --pair of--;

column 10, line 51, delete "two", insert --the pair of--; and column 10, line 61, delete "threshold", insert --threshold value--.

Signed and Sealed this

Twenty-second Day of December, 2009

David J. Kappos
*Director of the United States Patent and Trademark Office*